Sept. 30, 1958 J. W. PAYNE ET AL 2,854,160
ARRANGEMENT FOR FEEDING SOLID GRANULAR MATERIAL
Original Filed March 25, 1953 5 Sheets-Sheet 5

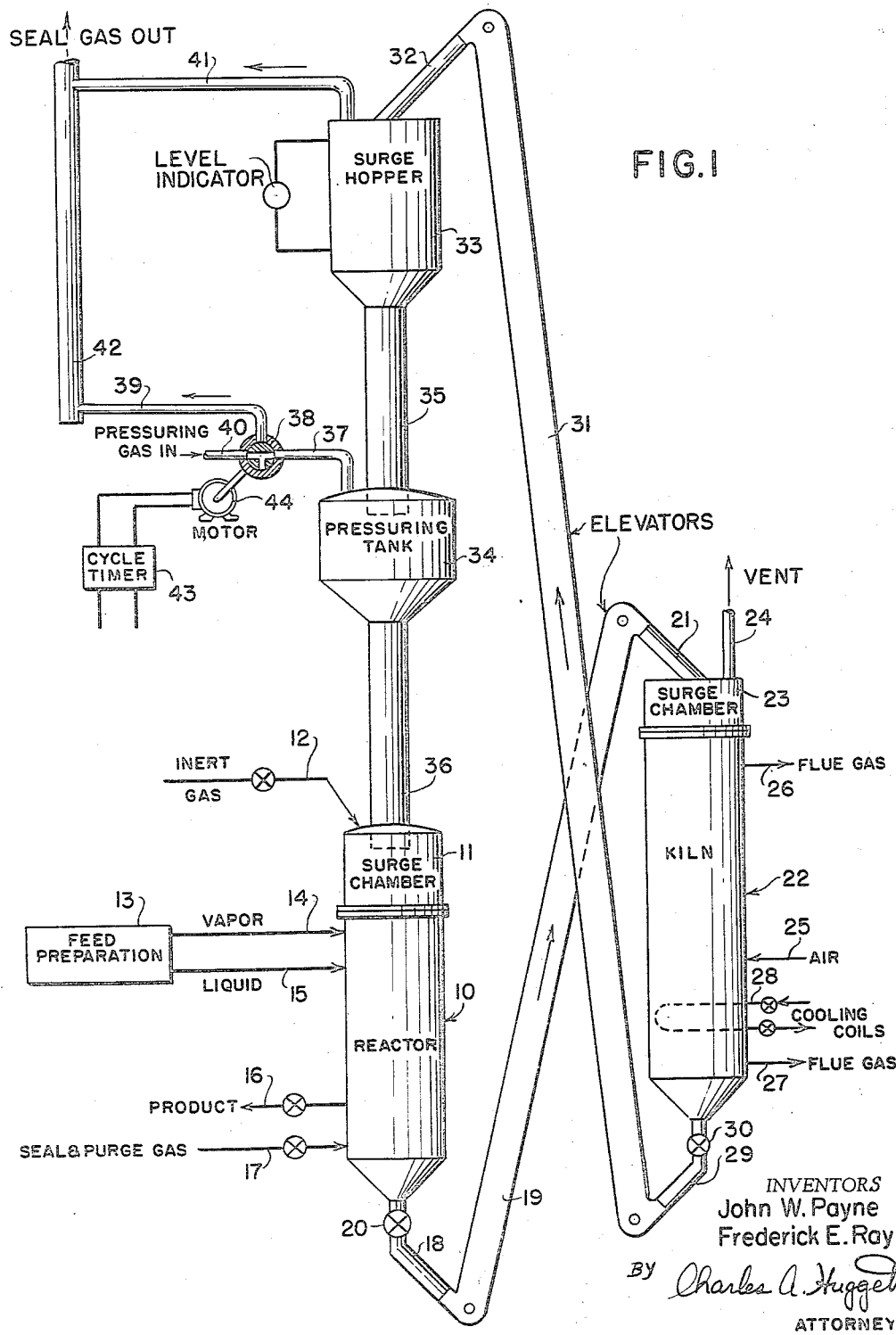

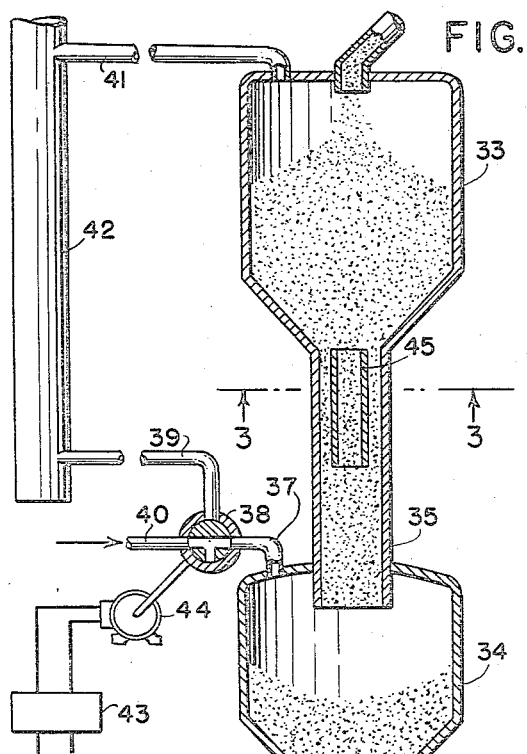
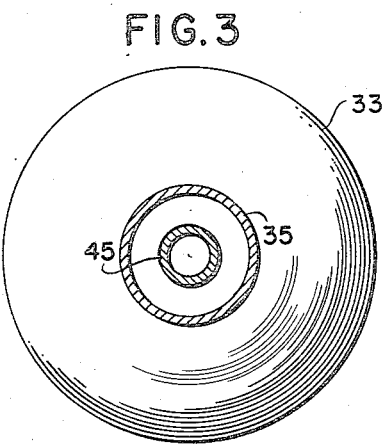
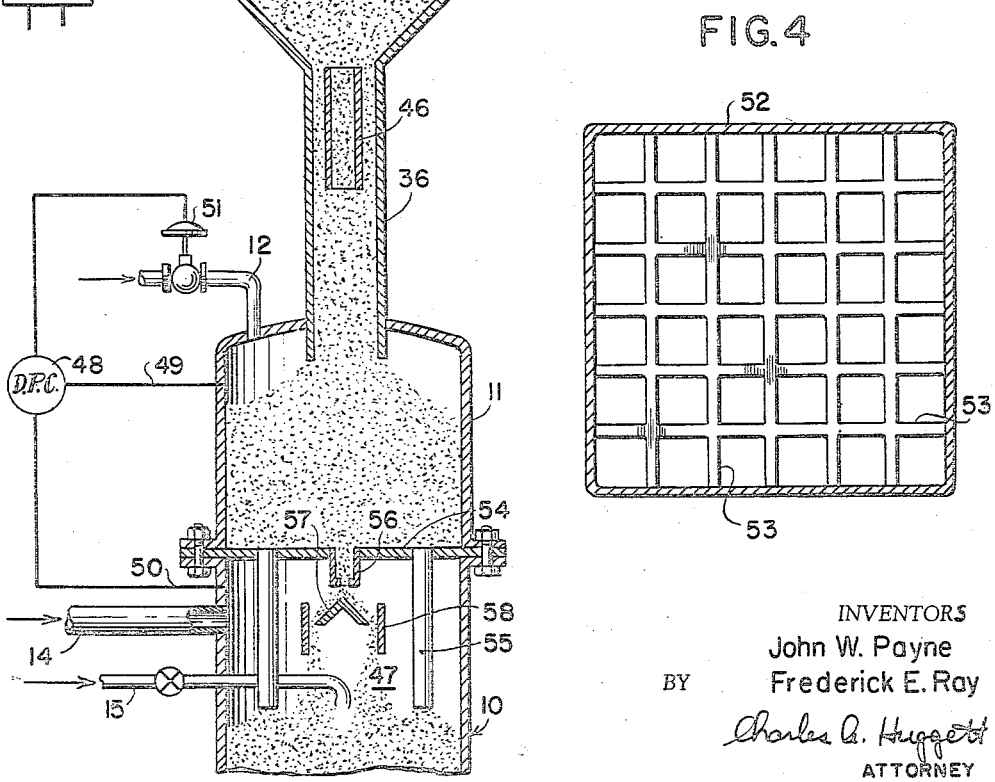

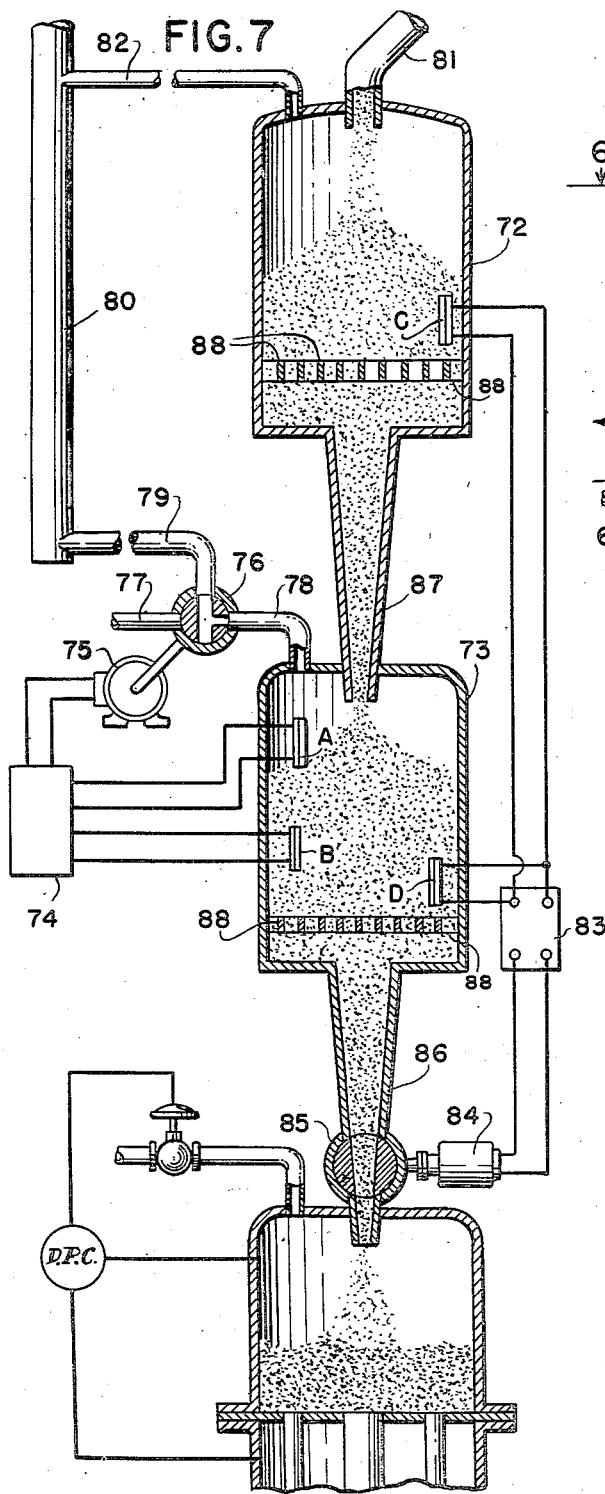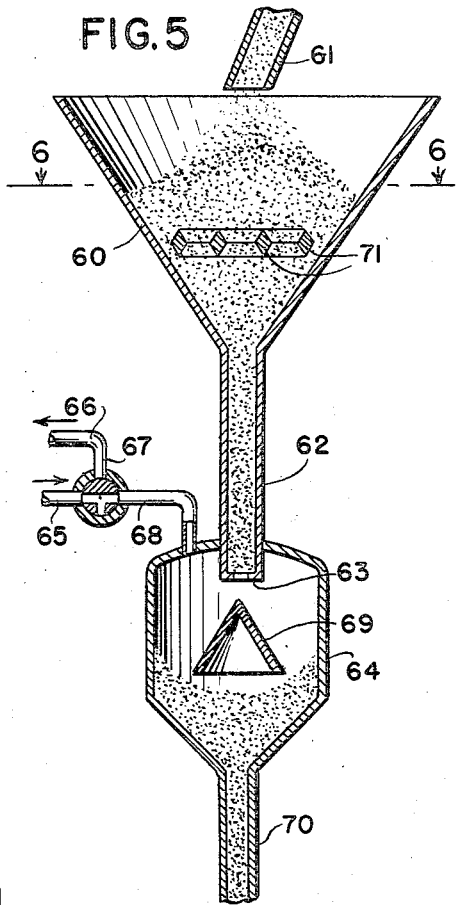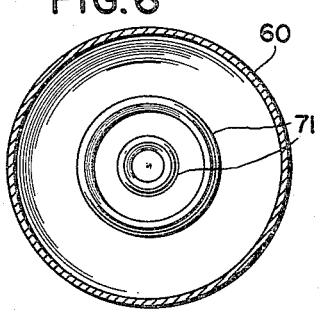

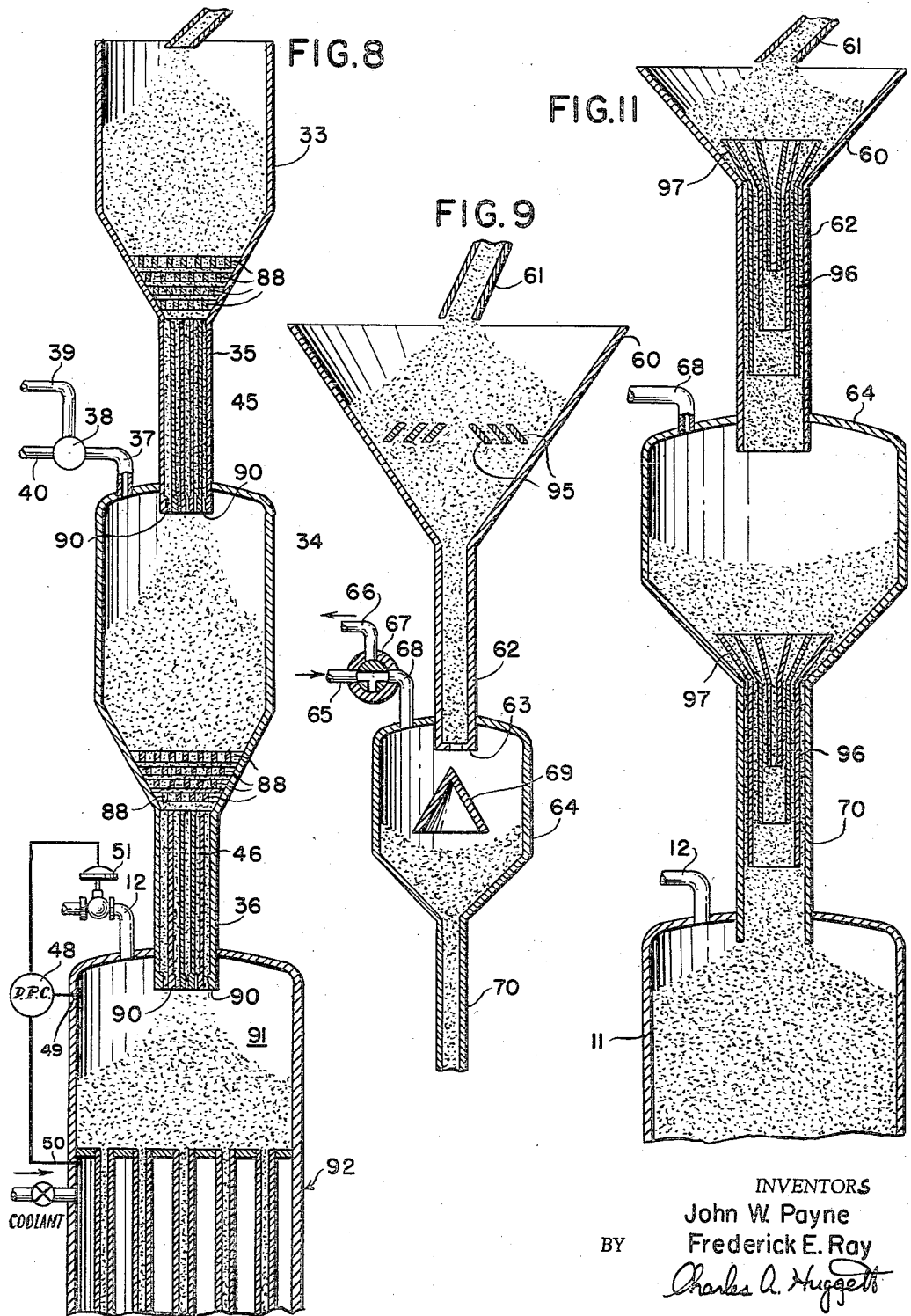

INVENTOR.
John W. Payne
Frederick E. Ray.
BY
Charles R. Huggett
ATTORNEY 2,854,160
Patented Sept. 30, 1958

2,854,160

ARRANGEMENT FOR FEEDING SOLID GRANULAR MATERIAL

John W. Payne, Woodbury, and Frederick E. Ray, Glen Rock, N. J., assignors to Socony Mobil Oil Company, Inc., a corporation of New York Original application March 25, 1953, Serial No. 344,576. Divided and this application April 17, 1953, Serial No. 728,943

9 Claims. (Cl. 214—152)

This invention pertains to the transfer of solid particles from a zone at low pressure to a second zone at a substantially higher pressure. It more particularly relates to the introduction of granular catalyst or contact material into a gas contacting zone maintained at advanced pressure, such as a reaction zone from a storage zone maintained at a lower pressure located above the contacting zone.

The invention is particularly suited for use in moving bed conversion systems of the general type in which reaction and regeneration are accomplished simultaneously in separate confined zones through which the catalyst or contact material is passed as a relatively compact bed of solid particles. The fluid reactants, such as hydrocarbons, properly prepared for conversion, are passed through the bed of solid particles in the reaction zone continuously and the regenerating fluid is passed through the bed of solids in the regeneration zone. The particles are transferred continuously from the bottom of one zone to the top of the alternate zone to complete an enclosed cyclic path. The particles may be elevated between the zones by means of mechanical elevators of the bucket or Redler type, fluid lifts wherein the particles are propelled upwardly through a lift passage in a stream of rapidly moving lift gas or gas pressure lifts wherein the granular material is moved upwardly through an upwardly directed pipe as a continuous confined column by means of the gas pressure differential across the pipe. Various processes to which this invention can be applied include reforming, hydroforming, cracking, isomerization, alkylation, isoforming, aromatization, dehydrogenation, hydrogenation, cyclizing, dehydrocyclizing, treating, polymerization, coking and visbreaking.

Realizing that the invention has broad application to many processes, such as those listed above, as well as to other gas solids contacting operations, it will be described with reference to the catalytic cracking of hydrocarbons to produce lighter material boiling in the gasoline boiling range. The catalyst in this process is gravitated as a substantially compact bed through the reaction zone. The zone is maintained at a temperature of about 800–1000° F. and at an advanced pressure of about 5 to 60 p. s. i. (gauge). The reactant material is usually preheated to about 700–800° F. and introduced into the upper portion of the reaction zone to contact the solids bed. The reactants may be in the liquid, vapor, or mixed liquid and vapor phases. Upon contacting the hot catalyst, the liquid portion is rapidly transformed into a vapor and the gas travels through the void spaces in the catalyst bed. The converted hydrocarbons are continuously withdrawn from the bed. The flow of reactants may be concurrent, counter-current, split flow or even cross flow with respect to the flow of the catalyst. The catalyst is removed continuously and transferred to the top of a gravitating bed of solid material in the regenerating zone. A gas, usually air, is introduced into the bed of solids in the regeneration zone to burn the carbonaceous material from the surface of the contact material. The flue gas is removed continuously from the zone after passage through the required depth of catalyst bed. The pressure is generally maintained at substantially atmospheric pressure although in some instances, it is desirable to maintain this zone at other pressures. The temperature in the regenerating zone is usually maintained at about 1000–1300° F. When inerts are used, such as Carborundum, coke or fused alumina, the temperature may be substantially in excess of 1300° F., but for catalytic cracking, the upper limit must not be exceeded or the catalyst material will be heat damaged and rendered unfit for reuse. The heat damaging temperature varies to some extent with the type of catalyst material being used, e. g., the limit for natural or treated clay catalyst is about 1200° F., whereas the limit for silica-alumina gel type catalyst is about 1400° F.

The regenerated or reactivated contact material is withdrawn from the bottom of the regeneration zone and transferred continuously to a hopper located above the reaction zone. The hopper is generally maintained at a pressure about equal to that in the regeneration zone. Therefore, the contact material must be transferred from the hopper downwardly into the reaction zone against a substantially advanced pressure. In the prior art, the hopper has been located a substantial distance above the reactor and the contact material gravitated as a compact column downwardly from the bottom of the hopper through an elongated conduit or gravity feed leg of restricted cross-section. The gravity feed leg is described and claimed in U. S. Patents 2,410,309 and 2,531,365. This feed leg comprises an elongated substantially compact column of catalyst in an upwardly-directed passage above the reaction zone in open communication with the pressured reaction zone. The calculated head or weight of catalyst in the column per unit of cross-sectional area is sufficient to permit the catalyst to feed into the reaction zone smoothly against the advanced pressure without restrictions in the passage. There is no head developed in a catalyst column maintained in compacted form in the manner that a fluid head is developed at the base of a pipe full of fluids. However, it has been found that when the value obtained by dividing the weight of catalyst in the column by the cross-section of the base of the column is above a critical limit, the solids will flow downwardly in compact columnar form into the advanced pressure zone and when the value is below the critical level, the solids will not flow. It is convenient, therefore, to refer to the so-called calculated head of catalyst in the feed leg. The column is made as small as possible in cross-section, consistent with the catalyst flow requirements of the reaction zone, to prevent escape of reactants from the reaction zone. The top of the column is continuously replenished with catalyst from the storage zone. The gravity feed legs of the compact flowing catalyst type required the provision of roughly 4–5 feet of leg height per pound of pressure differential across the leg. As a result of obvious practical considerations, such legs have not been recommended in systems requiring the feeding of catalyst against gaseous pressure differential in excess of about 30 pounds and have not been used commercially for feeding against pressures in excess of about 15 p. s. i. (gauge). Even in the present day commercial catalytic cracking units these legs are about 80–100 feet tall and require extensive structural steel to support them and their related hoppers at heights up to twice the heights which would be required if they could be eliminated.

A method has been described in copending application Serial Number 390,468, filed November 6, 1953, for eliminating the gravity feed leg. This method makes it possible to utilize materially greater reaction pressures and yet use structures which are substantially smaller in height than former conversion systems. In simple form, this method comprises gravitating solid granular material from a low pressure supply zone or hopper downwardly through a short passage of restricted cross-section into a pressuring zone of enlarged cross-section, while the pressure in the pressuring zone is substantially that of the low pressure supply zone. At intervals the pressure in the pressuring zone is increased until it is substantially the same or slightly greater than the pressure in the reaction zone, located just below the pressuring zone. The granular material then is gravitated through a short passage of restricted cross-section from the pressuring zone into the high pressure reaction zone. While the pressuring zone is under pressure, the short passage above this zone remains full of granular material in static compact form, serving as a seal for the pressuring zone. This is accomplished by expanding the cross-section of the column of granular material at the upper end of the short passage or within the supply zone so that the upward gas velocity at some level in the column at the upper end of the passage or within the supply zone is below the linear gas velocity required to boil the granular material, e. g., to disrupt its compacted state. The short passage has a pressure drop thereacross which is greater than the calculated head of catalyst in the leg. Disruption of the column of catalyst is prevented because there is provided and maintained at all times a bed of catalyst above the level where the upward gas velocity falls below the boiling velocity which is sufficient to overcome the upward forces at that level and maintain the catalyst in the leg in compact form. In order to insure the short passage running full of granular material, a restriction may be provided at or adjacent to the lower end thereof so that when flow occurs through this passage, it is not of the "free fall" type but rather as a compact gravitating stream of granular solid material. After the level of solids in the pressuring zone has dropped to a pre-determined level, the pressure is released therein and the pressuring zone again fills with solid material from the low pressure supply zone or hopper. Meantime, the short passage connected between the pressuring zone and the top of the reactor serves as a seal in a manner similar to that described for the short passage between the low pressure zone and the pressuring zone.

One aspect of this invention involves the introduction or location of partitions in at least the upper portion of the short seal legs between the low pressure supply hopper and the pressuring zone, and between the pressuring zone and the reactor. This invention also involves the use of partitions in the low pressure hopper and in the pressuring zone at a level below the surface of the granular material. The provision of these partitions in the seal leg and in the hopper thereabove makes it possible to seal against substantially greater pressure differentials or use substantially shorter seal legs.

The object of this invention is to provide an improved method for feeding a palpable particulate solid material from a zone at one gaseous pressure to a second zone at another and higher gaseous pressure.

A further object of this invention is to provide an improved method for feeding a granular solid material from a low pressure region to a high pressure region located therebelow through a passage in continuous open communication with both regions.

A further object of this invention is to provide an improved method for transferring solids from a supply zone maintained under one gaseous pressure into a gas contacting zone located therebelow maintained under an advanced gaseous pressure through a connecting passage in open communication with both zones.

A further object of this invention is to provide an improved method for feeding a granular contact material into the top of a high pressure reactor of a moving bed hydrocarbon conversion system.

These and other objects of the invention will be made more apparent in the detailed description of the invention which follows.

The invention will be described in detail with reference to the following figures:

Figure 1 shows diagrammatically a complete hydrocarbon conversion system.

Figure 2 shows in vertical cross-section the improved feeding arrangement including a supply hopper, a pressure hopper and the top portion of a contacting reactor with connecting short conduits.

Figure 3 shows a cross-sectional view as seen on plane 3—3 of Figure 2 showing the use of concentric pipes in the short seal leg as partition members.

Figure 4 shows another cross-sectional view of a seal leg showing an alternative partitioning arrangement.

Figure 5 shows in vertical section a partitioning arrangement for use in the supply or pressuring hoppers.

Figure 6 shows in horizontal cross-section the hopper of Figure 5 as seen on plane 6—6.

Figure 7 shows in vertical elevation the feeding arrangement with grating installed in the supply and pressuring hoppers.

Figure 8 shows the feeding arrangement in vertical section with concentric pipes installed in the seal legs and grating installed in the hoppers thereabove.

Figure 9 shows the feeding arrangement in vertical section with an alternate baffle system installed in the hopper.

Figure 11 shows in vertical section an alternate arrangement of partitioning the feed hopper and seal leg.

Figure 10:
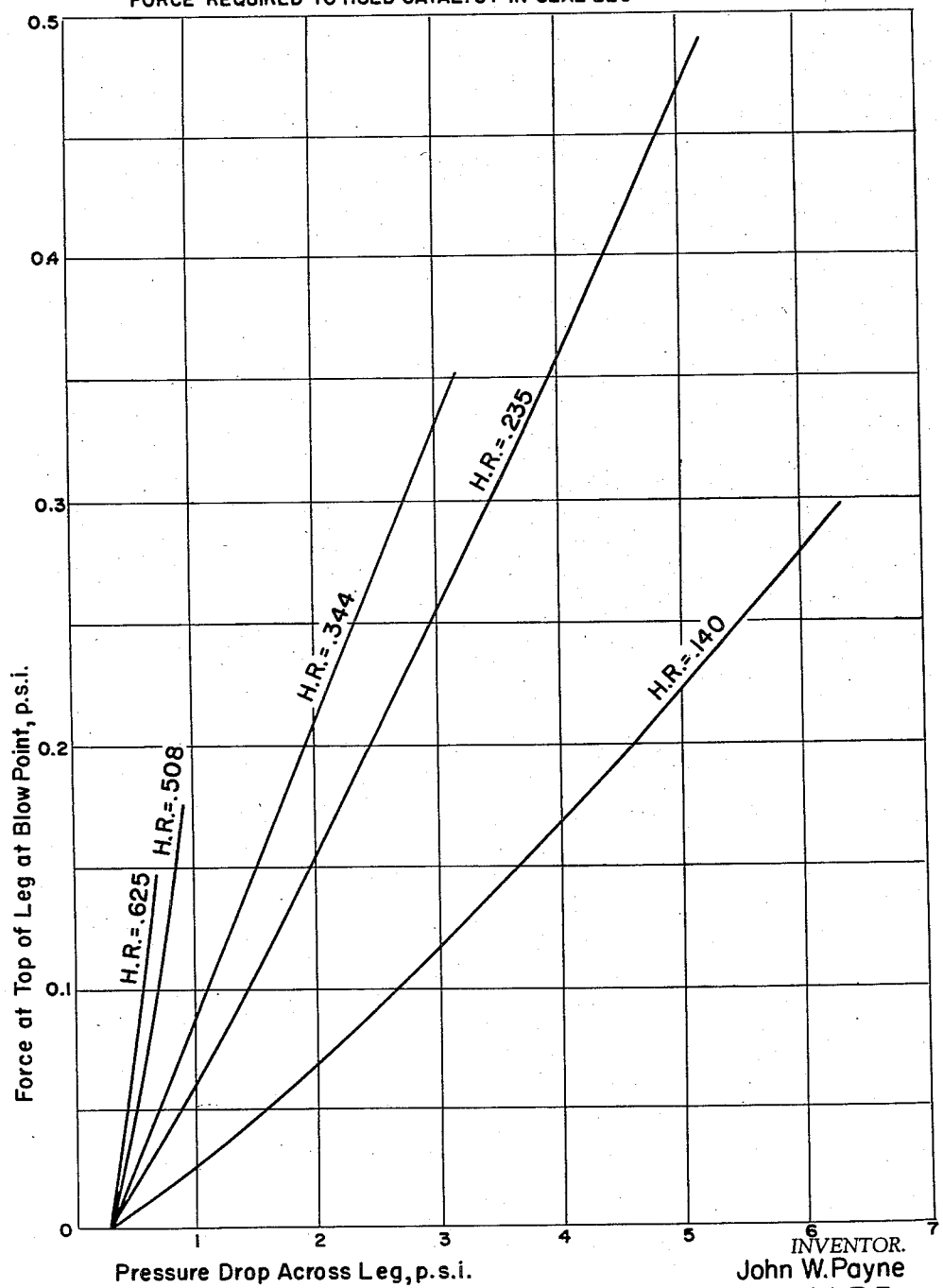
Figure 10 shows a plot of force required to hold catalyst in seal leg vs. pressure drop across the leg at blowout, for seal legs of various hydraulic radii.

Referring to Figure 1, the invention is applied to a typical moving bed system, such as a catalytic hydrocarbon conversion system for cracking heavy hydrocarbons to produce light material boiling in the gasoline boiling range. The palpable particulate material is gravitated through the vessel or reactor 10 as a continuous column in which the particles remain in contiguous contact throughout their travel through the vessel. A surge chamber 11 may be provided in the upper portion of the vessel by means of a horizontal partition and depending pipe baffle arrangement, common in hydrocarbon conversion art. An inert gas may be introduced into the surge chamber 11 through the conduit 12 at a pressure slightly higher than the pressure in the reaction zone. Hydrocarbons may be prepared for cracking in suitable feed preparation apparatus, illustrated by block 13, and transferred by the pipes 14, 15 as vapor and liquid material to the column of solid material in the reactor 10. The hydrocarbons travel downwardly through the voids in the catalyst bed and the converted products are withdrawn from the lower portion of the reactor through the conduit 16 to further processing apparatus, not shown. The catalyst bed may be maintained at a temperature of about 800–1000° F. and under a gaseous pressure of about 15–100 p. s. i. (gauge). If reforming operations rather than cracking reactions are to be performed in the reactor this pressure may be substantially in excess of 100 p. s. i., for example, 200–300 p. s. i. A seal and purge gas, such as steam or flue gas, may be introduced through the conduit 17 into the lower portion of the reactor 10 to strip the solids of vaporizable hydrocarbons and remove them through the conduit 16. The stripped solid material is withdrawn from the bottom of the reactor through the the conduit 18 and flows by gravity to the bottom of the elevator 19. The valve 20 may be used to control the downward flow rate of the granular material in the reactor and maintain the granular particles in compacted form throughout the reaction zone. The particles are discharged from the top of the elevator 19 into a descending conduit 21.

The particles flow by gravity through the conduit 21 into the top of the vessel or kiln 22. The upper portion of the kiln or burner 22 may have a surge chamber 23 formed by a horizontal partition and suitable depending pipes for transferring the solids from the surge region downwardly into the burning section of the kiln. The kiln 22 may be vented to the atmosphere by means of the vent pipe 24 located atop the vessel in communication with the surge chamber 23. Air is usually introduced into the lower portion of the kiln through the conduit 25 to travel upwardly and downwardly through the voids in the continuous gravitating column of solids and burn carbonaceous material from the contacting surface of the catalyst. The carbonaceous material, usually termed "coke," is formed during conversion on the exterior surface of the solids and within the pores of the adsorptive solid material. The burning effects at least partial removal of the coke with the resultant formation of a flue gas. The burning is usually effected under substantially atmospheric pressure and at temperatures of about 1000–1300° F. The flue gas is removed from the vessel 22 through the conduits 26, 27 in the upper and lower portions of the burning section of the kiln. Cooling conduits, such as 28, may be provided to control the temperature of the burning and prevent heat damage to the catalyst. The regenerated solid particles are withdrawn from the bottom of the burner 22 through the conduit 29. The flow rate of the solids through the burning zone is controlled by the valve 30 to maintain the particles in the form of a continuous column. The particles are lifted through the bucket elevator 31 and transferred by gravity through the short conduit 32 onto the top of pile of solids in the storage or surge hopper 33.

The surge hopper 33 is located a short distance above the reactor 10. A pressuring tank 34 is located between the hopper 33 and the reactor 10. A first short vertical conduit 35 is connected between the surge hopper and the pressuring tank 34 and a second short vertical conduit 36 is connected between the pressuring tank and the top of the reactor 10. A gas conduit 37 is attached to the top of the pressuring tank 34. The three-way valve 38 is adjusted to connect the conduit 37 with the conduit 39, permitting the pressure in the tank 34 to fall to atmospheric. Granular material gravitates through the conduit 35 to fill the tank 34. The three-way valve 38 is then adjusted to connect the conduit 37 with the conduit 40, permitting gas under pressure to be admitted to the tank 34 to raise the pressure in the tank to a pressure near that in the reactor. This permits the catalyst to feed downwardly from the pressuring tank by gravity into the reactor while preventing the flow of solids through the conduit 35. Although the pressure in the tank 34 may be high enough to blow solids upwardly through the conduit 35, this is prevented by this invention by a method disclosed in more detail hereinafter. The three-way valve 38 is continually changed from one position to the other periodically to prevent the pressuring tank from empting of solid material and to permit a fresh supply of solids to transfer from the storage hopper 33 to the tank 34. When the pressure in the tank 34 is high, gas escapes upwardly through the passage 35 and discharges from the top of the hopper 33 through the conduit 41. When the pressure in the tank is reduced, the gas escapes through the conduits 37 and 39. Both conduits 39 and 41 are connected into a stack 42, which may be vented to the atmosphere. The opening and closing of the three-way valve is preferably controlled by a cycle timer 43 which operates a motor 44 connected to the valve 38.

Referring to Figure 2, it will be noted that the storage hopper 33 and pressuring hopper 34 each have a gradually tapered bottom so that the catalyst column beginning at the base of each short connecting conduit 35, 36 is expanded at its upper end until an area is reached where the amount of gas which will normally escape upwardly through the connecting leg would not be sufficient to cause boiling of the contact material in the expanded bed. It is important to note that in any system wherein there is provided a seal leg of compacted granular material in open communication with the two zones at different pressure, a certain amount of gas will be forced by the pressure differential to pass upwardly through the interstices between the solid particles so as to escape from the upper end of the seal leg. This escape of gas can only be prevented by the provision of a very high and narrow feed leg through which the solid material is flowing downwardly at a relatively high velocity. In those cases, the amount of gas carried down in the voids of the moving stream of particles may exceed the amount of gas passing upwardly through the lower section of the seal leg, as described in more detail in U. S. Patent No. 2,531,365. However, in systems of the type herein involved where it is desired to save height by employing relatively short seal legs as compared to what was known to the prior art, the conditions are such that a certain amount of gas will pass upwardly through the short legs to the hopper thereabove. The resistance to this gas flow is almost exclusively the resistance offered through the narrow portion of the seal leg, such as the column in the conduit 36 when the pressure in the vessel 34 is low or the column 35 when the pressure in the vessel 34 is high. That is the portion of the column up to the conical base of the hopper thereabove. While the catalyst bed above this column does offer a slight resistance to gas flow, such resistance is negligible compared to that offered under the relatively narrow seal legs in the conduits 35 or 36.

When a substantial pressure drop is taken across the short seal legs, the upward gas velocity in the legs will be higher than that required to boil the catalyst and disrupt the bed. The upward gas velocity is reduced in the expanded portion of the column located in the bottom of the storage and pressuring hoppers. That is the purpose for providing the expanded bed on top of each column. At some level in the bed the upward velocity is reduced to the boiling velocity and with further expansion of the cross-section of the bed above that level, the gas velocity is reduced below the boiling velocity. By maintaining a bed of sufficient cross-section and depth above the critical level, that level at which the velocity of the gas is just equal to the boiling velocity, the entire bed and column can be maintained in fixed positions without any substantial movement of the solids. This limits the amount of gas which can escape upwardly from the high pressure zone through the short seal leg to the low pressure zone to a reasonable amount and permits maintenance of the pressure in the high pressure zone. At least one concentric conduit 45, 46 is located in the upper portion of each short conduit to split the flow of solids into several paths of reduced cross-section. By dividing the cross-section of the short conduit into several smaller laterally-separated flow paths, a greater pressure drop may be taken across the conduit or alternatively a smaller bed need be maintained above the critical level to prevent disruption of the bed and column. The location of the critical level in the bed is dependent of course upon the pressure drop across the column and bed, being higher for higher pressure differentials, other factors being equal. Although a hopper and tank with tapered bottoms have been shown on Figure 2, a flat bottom vessel may be used, as shown on Figure 7. In such a case, the gas would expand from the bottom of the tank up to a level above the bottom. The critical level would therefore be located at some level above the bottom of the tank in this case as well as in the case where the bottom of the tank is tapered. The upward force at the critical level in either case is due mainly to the upward push from the catalyst particles just below this level. This upward push is not very great because the walls of the seal leg, hopper and baffling means installed either in the top of the pipe, as shown on Figure 2, or hopper as shown on Figure 7, absorb most of the upward push. So only a bed of relatively low height is required above the critical level, but this bed must be provided or the leg will be lost. This bed must have two characteristics:

(1) It must have a height which is sufficient, either by itself or in conjunction with baffling means in the hopper thereabove, to overcome the upward force at the critical level and (2) It must be at least greater and preferably substantially greater in horizontal cross-section than the effective cross-section of the bed at the critical level.

Usually the ratio of $$\frac{\text{Diameter of feed tank}}{\text{Diameter of seal pipe}} =$$

broadly within the range about 3–10 where the average pressure differential across the seal leg is within the range about 1–15 p. s. i. per foot. For operations where the average pressure drop is of the order of 1¾ p. s. i. per foot of seal leg height, the above ratio should preferably be from about 4–6. Where the average pressure drop per foot is higher, for example, of the order of 2½ p. s. i. per foot and broadly in the range about 2½–5 p. s. i. per foot of seal leg height, the ratio of diameters should be not less than about 6. The minimum required bed height above the critical level depends, of course, on the relative cross-section of the bed above and below the critical level and on the catalyst density. Also, the minimum bed required increases substantially in direct proportion to the total pressure drop across the seal leg and bed thereabove. Also, it is influenced by the hydraulic radius of the seal leg and of the feed hopper at bed levels both above and below the critical level in the bed, other things such as ratio of hopper to seal leg diameter being constant. In general, a decrease in hydraulic radius in the seal leg or in the feed hopper by use of vertical partitions in the former and grating or baffles in the latter greatly reduces the minimum bed height required above the critical level. But in any event the minimum bed above the critical is usually above two inches and more often above six inches. The hydraulic radius is the cross-sectional area divided by the wetted perimeter.

Since it is important in this invention, for the reasons above discussed and also because of the practical desire to maintain loss of seal gas at a minimum to maintain the catalyst in the seal leg in compacted form, it also becomes important to provide near or adjacent the lower end of the narrow portion of the seal leg some means for restricting catalyst flow below the capacity of the portion of the seal leg thereabove. This means will prevent free flow of catalyst through the seal leg which would occur in the absence of such restriction. It will become apparent that if there were free flow conditions in the seal leg, the catalyst particles in the lower end thereof would not be compacted but would be spread out so that when pressure was applied to the pressuring hopper, it would be difficult to stop the movement of the catalyst so as to provide a continuous compact static leg of catalyst. The use of a resriction to prevent free flow of catalyst through a pipe is discussed at some length in U. S. Patent No. 2,423,411. As an alternative, the seal leg may be tapered as shown on Figure 7. The seal leg is tapered outwardly from bottom to top so that the gas passing upwardly through the leg of Figure 7 expands laterally. The reduction in upward gas velocity tends to maintain the catalyst in the pipe in compacted form. Tapering, therefore, not only prevents free fall of catalyst in the pipe but tends to promote a uniform pressure drop along the pipe. The pipe should have a substantial taper, such as 80 degrees with the horizontal, to insure that the material is maintained in compacted form throughout the entire length. The taper used to give uniform pressure drop along the length of the pipe will be sufficient to insure that the leg is maintained in compacted form. As a further alternative, the seal leg may be allowed to run free until the bed level in the pressuring zone rises to the bottom of the leg, thereby allowing the leg to be filled with contact material. The pressuring vessel is then put under advanced pressure.

In the operation shown in Figure 2, when the pressuring hopper 34 becomes full of catalyst, the pressure therein is increased to a level near that in the surge hopper or surge zone 11 in the upper portion of the reactor 10. This pressure may be below that in the surge zone 11, equal to that in the surge zone 11 or somewhat higher than that in the surge zone 11. However, if it is below the pressure in the surge zone 11, then a long enough seal leg must be provided in the conduit 36, so that it will force catalyst into the top of the reactor 10 by gravity feed principles, which are disclosed in detail in U. S. Patent No. 2,410,309. In the preferred form of this invention, the pressure in the hopper 34 is equal to or above that in the surge zone 11, in order that the conduit 36 may be as short as possible. If the pressure in the hopper 34 is above that in the top of the reactor 10, a smaller diameter conduit 36 can be used because more catalyst can be pushed through a pipe of given diameter if there is a pressure differential existing in the direction of flow of the solid particles. Thus, by this means it is possible to provide a smaller diameter seal leg in conduit 36 than otherwise, thereby cutting down the loss of seal gas through the leg when the pressure in the hopper 34 is released. After the bed in the hopper 34 has reached a level not very much below that shown on Figure 2, the three-way valve 38 is reversed allowing gas to escape through conduits 37 and 39 to the stack 42. When this is done, catalyst again feeds from the hopper 33 to the hopper 34. Under these conditions, the hopper 34 is at a much lower pressure than the surge zone or chamber 11, which is always maintained at an inert gaseous pressure slightly higher than that in the reaction zone 47. A differential pressure controller 48 has pressure connections 49, 50 attached to the surge and reaction zones and is operably connected to the valve 51 in the inert gas line 12. The apparatus is used to maintain the pressure differential between the zones at about ⅛–¼ p. s. i. So while hopper 34 is being filled with catalyst, the leg 36 serves as a seal in the same way in which leg 35 served as a seal while hopper 34 was emptying. In the system shown, the three-way valve 38 is operated by means of a motor controlled by a cycle timer. The size of the hopper 34 and the legs 35 and 36 feeding catalyst to the hopper 34 and from it are made such in relationship to the selected cycle time, which is controlled by the instrument 43, so that in the time allowed for maintaining hopper 34 under pressure, the catalyst level in hopper 34 will not fall below a predetermined level. Obviousy, if the level of the bed in hopper 34 were permitted to fall too low into the conical portion thereof, the bed surface might be so low as to correspond to or be below the level at which the gas escaping from the chamber 11 into the hopper 34 would reach a catalyst boiling velocity. In this connection, it is important to distinguish between boiling velocity and terminal velocity. The terminal velocity is that upward gas velocity required to just lift the catalyst whereas the boiling velocity is considerably below that required to lift the particles. By way of definition, it is important in this invention that the catalyst in the seal leg and in the bed be maintained in compacted condition. This means that the catalyst particles rest upon each other and any catalyst particle is supported by catalyst particles therebelow and on either side thereof. It is not supported by flowing gas. In a boiling or fluidized bed, the catalyst particles are supported either entirely by the gas for very dilute suspensions or in part by the gas and in part by smaller catalyst particles which in turn are suspended by the gas. There is a very substantial difference in the amount of gas which will pass through a bed which is in compacted condition as opposed to the amount of gas which will pass through a bed which is boiling or is fluidized. Where catalyst is poured into a bin so that it forms a pile or bed therein in the absence of gas flow we have a compacted bed, provided the catalyst does not consist entirely of powdered material of fairly small size. It is true that some additional compacting might be obtained by jostling the bed or agitating it so as to make the particles fall into void spaces which can be provided in this manner. Also, it is true that there is a slight further compacting of the catalyst in the seal leg where pressure is applied against it. All of these conditions come within the definition of a compacted leg or bed. However, where due to gas flow therethrough a bed of granular material which has been formed by permitting a catalyst pile to accumulate on the bottom of a container begins to expand, the bed is no longer in compacted condition and the amount of gas which escapes through the bed rapidly increases. Moreover, particularly where granular particles are involved of palpable particulate form, there is a tendency for gas to rat-hole or channel from the bed and to flow upwardly therethrough in spouts. All of this means that the seal which was maintained by the compacted bed is lost and in cases where the pressure differential is relatively greater, the catalyst itself may be carried in the expanding gas outwardly from the top of the container.

This invention applies to catalyst and solid material of palpable particulate form such as spheres, pellets, tablets, and particles of irregular shape as distinguished from fine powdered material. The invention, in general, does not apply to fine powdered material mainly because such material will not flow downwardly by gravity alone through a feed leg or drain conduit. The material tends to bridge and plug the leg. However, the invention applies to catalyst particles down to that size range where such bridging will occur. It is estimated that the invention will probably apply to particles having an average diameter as low as about 100 mesh Tyler and it applies to particles ranging upwardly in size to 3 mesh and even larger by Tyler Standard Screen Analysis.

Referring now to Figure 3, there is shown a cross-section of the seal leg 35 as seen on plane 3—3 of Figure 2. It is seen that the pipe 45 is concentrically located in the pipe 35. The size of the concentric pipe is selected so that the hydraulic radius of the pipe 45 is about the same as the hydraulic radius of the annular region between the two pipes. Figure 4 shows a seal leg 52 of square cross-section with baffles 53 located laterally across the duct to divide the cross-section into substantially equal squares. This effects a material reduction in the hydraulic radius of the duct.

Referring once again to Figure 2, chamber 11 is formed by the horizontal partition 54 and downcomer pipes 55. A portion of the catalyst is fed through outlet 56 to flow over the baffle 57 inside the enclosure 58, thereby forming a curtain of falling catalyst. Liquid feed is introduced through the pipe 15 into the region inside the curtain and is deposited on the falling catalyst particles. The hydrocarbon vapor is introduced through pipe 14 into the region above the gravitating catalyst bed in the reaction zone 47.

Referring now to Figure 5 there is shown a slightly different type of feeding apparatus. The solids are fed to the bed in hopper 60 through the conduit 61. The seal leg 62 has an orifice plate 63 at its lower end for maintaining compact flow conditions in the leg. The pressuring pot 64 has pressuring apparatus comprising pressure line 65, exhaust line 66, three-way valve 67 and connecting line 68 located above and connecting with the roof thereof. A cone baffle 69 is centrally located inside the pot 64 to prevent the particles discharged from the leg 62 from fracturing in free fall to the bed of solids in the pot. The conduit 70 located below the pot is connected to a high pressure region, not shown. A group of concentric baffles 71 are located horizontally across the bottom of the hopper 60 to effectively reduce the hydraulic radius of the hopper at that level. The cross-section of these baffles is in the shape of a diamond. The side walls of the baffles are made steep with the horizontal (at least about 45 degrees) to prevent catalyst from hanging up on the baffles or to prevent a void space from forming under the baffles. The presence of the baffles in the hopper 60 makes it possible to operate the system successfully with a substantially smaller bed of catalyst in the hopper than would otherwise be required if no baffles were used. Figure 6 shows a cross-sectional view of the hopper 60 as seen on plane 6—6 of Figure 5.

Figure 7 shows a catalyst feeding system in which the legs are tapered, the bottom of each vessel is flat and a different type of control system is utilized. In this figure there are provided level measuring devices within the storage hopper 72 and pressuring hopper 73. The devices illustrated are of the resistance type of level indicator, such as shown in U. S. Patent No. 2,458,162. Thus, when the level reaches indicator A in the pressuring tank, the instrument 74 automatically starts the motor 75 which rotates the valve 76 allowing gas to enter through conduits 77 and 78 to the vessel 73. The level of solids in the vessel drops to indicator B when the instrument automatically reverses the valve 76 allowing gas to escape from the vessel 73 through the conduits 78 and 79 to the stack 80. The solids are fed to the storage hopper 72 through the conduit 81 and gas is allowed to escape from the hopper 72 to the stack 80 through the connecting conduit 82. Level indicators C and D are located in the hoppers 72 and 73 for emergency purposes. When the level in either hopper falls to these indicators the instrument 83 causes the motor 84 to close a safety valve 85 in the leg 86, thereby preventing gas from escaping from the reaction zone upwardly through the legs 86 and 87 to the atmosphere. This is only necessary in the event that the level of the solids bed in either hopper should fall to that level at which the leg would be blown out by the upwardly flowing gas. A series of vertical baffles 88 are shown arranged laterally across the hopper 72 to form a grid therein. The grid materially reduces the hydraulic radius of the vessel at the level of the grid. The grid takes up a large portion of the upward thrust and makes it possible to use a shallower bed in the vessels 72, 73 than would otherwise be possible. The legs 86, 87 are shown tapered to maintain the solid material in substantially compact condition during downward transfer through their legs.

A further improvement of the invention is shown on Figure 8 where parts similar to the apparatus of Figure 2 have been given identical numbers. The concentric pipes 45 and 46 have been extended from the top to the bottom of the conduits 35 and 36. Several layers of grids 88 have been located in the vessels 33 and 34. Orifice plates 90 are located at the bottom of the pipes to maintain compact flow in the annular passages. This combination has been found to give superior results to the use of either baffles in the seal leg or grids in the bed atop the leg alone. The subway grating 88 in vessels 33 and 34 may be similar to the separators used in egg crates but must be rigidly attached in the vessels. It divides the vessel cross-section into small squares, providing minimum resistance to downward flow of solid material. It has been found desirable to have the hydraulic radius in the leg less than four inches and preferably less than two inches. The hydraulic radius in the bed above the leg may be as high as sixteen inches but should preferably be less than two inches also. The hydraulic radius is the cross-sectional area divided by the wetted perimeter. For a circular pipe, for example, $$R = \frac{D}{4} \text{ inches}$$

This invention finds application in situations where the average pressure differential across the seal leg is at least 1 to 15 p. s. i. per foot of vertical seal leg length. The invention can be used where the pressure differential is lower, for example, upwards of about 0.5 p. s. i. per foot of leg. Generally, however, the invention is utilized where the pressure differential is at least 2½ p. s. i. per foot of leg. These numbers are given by way of example for systems using granular solids having a density within the range about 25–60 pounds per cubic foot.

*Example I*

For an 8-inch diameter seal leg 10 feet long and having a conical hopper on top thereof having a diameter at the bottom of the cone equal to 8 inches and a diameter 41½ inches above the bottom of the cone equal to 51 inches, the taper being uniform from bottom to top the following tests were made:

| Conditions | Total Bed Height in Hopper, Inches | Bed Height Above Critical Level, Inches | Pressure Differential, p. s. i. |
| --- | --- | --- | --- |
| No partitions or grating | 36 | 24 | 29 |
| Concentric 2" and 5" pipe in top 7½" of seal leg | 36 | 16.5 | 56 |
| 1 level of grating, 33" above bottom of storage hopper | 36 | 10.5 | 125 |

The grating used provided substantially equal vertical passages 1 inch by 4 inches in cross-section and 1 inch long.

*Example II*

Using the same apparatus as used in Example I a test was conducted with gratings at 3 levels, 15", 18" and 21" above the bottom of the hopper and without partitions in the seal leg. The following results were obtained:

Blow-out of the leg occurred at pressure differential across the leg in excess of 110 p. s. i. A bed level about 2–4 inches above the critical maintained the bed in compact condition at a pressure differential of 110 p. s. i.

Figure 9 shows a feeding apparatus in which sloping concentric baffles 95 are used. It is preferable that the baffles 95 have a slope with the horizontal at least equal to 45 degrees, so that the solids will flow freely between the baffles. Figure 11 shows an alternate embodiment in which the concentric baffles 97 slope outwardly from bottom to top and are attached to the upper ends of concentric pipes 96 in the seal legs 62 and 70. The slope of the baffles 97 with the horizontal is made gradually steeper from outside to inside and the concentric pipes 96 are made shorter from outside to inside. In other words, the innermost pipe projects the shortest distance into the seal leg and has a conical baffle at its upper end with the steepest slope with the horizontal. The baffles are arranged so that the catalyst feeds through the annular passages at substantially uniform rates and does not feed faster through the central passage than the outer passage. This embodiment is disclosed in more detail in copending application for U. S. Patent Serial Number 624,455, filed November 26, 1956.

Apparently in the instant invention the forces arising from the imposition of a gaseous pressure at the base of the seal leg are transmitted to the walls of the seal leg and also to the walls in the hopper thereabove. By increasing the amount of surface area available for given horizontal cross-sectional area for flow, i. e., by decreasing the hydraulic radius, more surface is provided to absorb the upward force components and thereby within certain limits the amount of pressure differential which can be maintained across a seal leg of given height with a bed in the surge hopper of given height thereabove can be increased. While the provision of bed height above the stated critical minimums may further increase the allowable reduction of differential pressure, this further increase is of relatively small order. Thus for a cylinder 10 feet in diameter the amount of force exerted on a given central area of the bed will increase with bed height only within certain limits. For example, a bed 50 feet in height would create at its bottom 90 percent of the pressure which a bed of infinite height would exert and a bed 25 feet in height, that is, 2½ times the vessel diameter, would exert 70 percent of the total possible pressure from a bed of infinite height. In the broadest form of the invention there must be maintained above that level in the hopper where the gas velocity has been reduced to a point just below that which would boil the catalyst in the absence of further bed thereabove, a bed of at least as great and preferably greater effective cross-sectional area having a height at least equal to 2 inches and preferably at least equal to 6 inches. As an example of what is meant by a gas velocity just below that which would boil the catalyst, such a velocity would be one which will give rise to a pressure drop per foot of bed ½ inch of water or less below that which would boil the catalyst. The upper end of the column formed in the seal leg must be expanded and must be of such height, so as to provide above that level in the hopper at which the gas velocity has been reduced to a value just slightly below that corresponding to the gas velocity required to boil the catalyst at that level in the absence of bed thereabove, a further bed thereabove which gives rise to a calculated head substantially greater than a measured static pressure at that level.

In general, when using grating in the hopper and baffles in the seal leg, there should be provided passageways having a lateral dimension equal to at least five times the largest catalyst particle diameter in the hopper and at least eight times the largest catalyst particle diameter in the seal leg. Normally the minimum lateral dimension of the passageway in the hopper should be at least ¾ inch and in the seal leg at least 1 inch and preferably in both cases this dimension should be at least 2 inches.

The invention finds application in the T. C. C. process wherein the reactor is operated at 15 p. s. i. and the kiln at atmospheric pressure. Another example is one wherein the reactor is operated at 50 p. s. i. and the kiln is operated at 10 p. s. i. for example. A further application of the invention is a reforming operation of the continuous moving bed type wherein the kiln is operated at about one p. s. i. and the reactor is operated at 175 p. s. i. Still another example is a lift system of the compact type wherein the lift feed zone may be pressured intermittently to pressures as high as 200 p. s. i., these zones being bed from a reactor or kiln operating under a substantially lower pressure. In some cases, such as the supply of catalyst into hydrocarbon conversion reactors, it is desirable to provide seal gases of inert make, such as steam, flue gas and nitrogen in the upper portion of the reactor above the catalyst conversion bed. Also in such cases, it is usually desirable to employ an inert gas as a pressure gas in the pressuring tanks. In other cases, such as the supply of catalyst to a high-pressure regenerator, the use of air in the pressuring tanks may be satisfactory provided excessive burning does not occur. In such cases it also may be desirable to use flue gas. However, in such cases the use of a sealing gas at the upper end of the kiln is not necessary. Similarly, in feeding grains to pressure hoppers or feeding low-pressure solid material such as coal to blast furnaces, air may be employed as a pressuring medium in the pressure feed tanks. As stated above, the loss of seal gas may be reduced by permitting a certain concentration of fines to accumulate in the circulating solid stream. Usually, however, the loss of seal gas is maintained at a minimum by designing the seal pipe with a diameter as small as permitted by the other operating conditions involved. The invention is not necessarily limited to cyclic systems wherein the particles are maintained in compact condition in the contacting zones. The upward gas velocity in these zones may, if desired, be high enough to disrupt or even boil the bed and provided the solids are large enough to flow in compacted form through the seal legs, the invention will be operable.

With respect to cycle time, a suitable cycle will take 30 seconds to fill, 15 seconds to depressure, 30 seconds to empty, and 15 seconds to pressure the pressure pot when using such a system for feeding a T. C. C. reactor.

In systems such as the T. C. R. system, a continuous reforming system for upgrading gasoline, where the catalyst circulation may be of the order of $\frac{1}{10}$ of that involved in a T. C. C. system of comparable capacity, it will be desirable to employ longer cycles, for example 1–2 minutes to fill and 1–2 minutes to empty the pressuring tank.

Example III

The effect of hydraulic radius on blowout pressure was studied using a series of tubes of different HR, all being about 12½ inches long and of different diameters. A screen was placed across the catalyst column in the tube and weighted, so as to produce a uniform downward pressure per square inch of cross-section. Increasing gas pressure was applied to the bottom of the tube until blowout occurred. The following results were obtained:

| Dia. of Tube | Downward Pressure, p. s. i. | Blowout Pressure Total, p. s. i. | Hydraulic Radius, inches |
|---|---|---|---|
| 2.5 | 0.15 | .70 | .625 |
| 2.0 | 0.15 | .85 | .508 |
| 1.5 | 0.15 | 1.50 | .344 |
| 1.0 | 0.15 | 1.90 | .235 |
| 0.5 | 0.15 | 3.60 | .140 |

Thus decreasing the hydraulic radius of the leg permitted the use of a high pressured drop across the leg before blowout occurred.

It has been found that concentric pipes are most effective in the upper portion of the seal leg. Although they are somewhat more effective when extended the entire length of the leg, they provide a substantial portion of their possible improvement when extended downwardly about 1¼–3 pipe diameters from the top of the seal leg. The height of the grating used in the hopper should be at least equal to the minimum lateral dimension of the passageway formed by the grating and preferably at least equal to the effective diameter of the passageway so formed. This is the diameter of a circle which would provide the same area as that of the passageway formed by the grating baffles. The maximum height of grating used depends upon the pressure differential to be maintained across the seal leg. When higher pressure drops across the seal leg are contemplated, a fixed apparatus combination can be adapted to handle the increase in pressure by increasing the height of the grid baffles or by increasing the number of layers of grids.

Example IV

The effect of increasing the number of levels of grating was tested using the apparatus of Example I with 3" and 5" diameter concentric pipes extending downwardly from the top of the seal pipe about 2½ feet. The grating used was standard subway grating, $\frac{3}{16}$" flat stock, 1 inch tall, connected every 4 inches by a twisted ¼" bar. The following results were obtained.

| Height of Clay in Hopper | No. of Gratings | Maximum Pressure, p. s. i. g. |
|---|---|---|
| 2 ft | 0 | 40 |
|  | 1, 15" up | 76 |
|  | 2, at 15" and 18" | 95 |
|  | 3, at 15", 18" and 21" | 118 |
|  | 4, at 15", 18", 21" and 24" up | 127 |

Referring now to Figure 10 there is shown a plot of force required to hold catalyst in seal leg v. pressure drop across the leg at blowout for seal legs of various hydraulic radii but the same total length. It is seen that the seal leg of smallest HR provides the most effective seal leg.

It should be understood that this invention covers all modifications and changes of the examples herein chosen to illustrate the invention for purposes of disclosure, which do not constitute departures from the spirit and scope of the invention.

This application is a division of application Serial Number 344,576, filed March 25, 1953.

What is claimed is:

1. In a process for transferring solid material of palpable particulate form from one location to another, the method comprising: passing the solid material downwardly from a first region through a confined passage as a compact gravitating column of particles into a confined zone therebelow, periodically removing the solid material from said confined zone and simultaneously preventing the flow of solid material in said confined passage by increasing the gaseous pressure in said confined zone to a pressure which is above that in said first region by an amount in excess of the value obtained by dividing the weight of the solid material in said passage by the average horizontal cross-sectional area thereof and preventing disruption of the compactness of the column and upward discharge of the solid material from said passage by maintaining a reduced hydraulic radius of said passage by subdivision of the same and by maintaining on top of said column a compact bed of said solid material of substantially greater horizontal cross-sectional area than said column in which the gas escaping from said column decelerates, said bed being of sufficient horizontal cross-sectional area and vertical depth to effect deceleration of the gas to a linear velocity below that which would disrupt the compactness of said bed substantially before it reaches the surface of said bed.

2. In a process for transferring solid material of palpable particulate form from one location to another, the method comprising: passing the solid material downwardly from first region through a confined passage as a compact gravitating volumn of particles into a confined zone therebelow, periodically removing the solid material from said confined zone and simultaneously preventing the flow of solid material in said confined passage by increasing the gaseous pressure in said confined zone to a pressure which is above that in said first region by an amount sufficient to force the solid material to move upwardly through and out of the upper end of the passage and preventing disruption of the compactness of the column and upward discharge of the solid material from said passage by maintaining the same divided into laterally separated subdivisions having minimum lateral dimensions of at least eight times the maximum particle diameter of solid material and a hydraulic radius of less than two inches, and by maintaining on top of said column a compact expanded bed of said solid material of such horizontal and vertical dimensions as to cause gas from the non-expanded portion of the seal column to be decelerated to a velocity slightly below the bed disrupting velocity at a level spaced a substantial distance below the bed surface, the length of the bed above that level being sufficient to overcome the upward thrust of the solid particles below that level.

3. In a process for transferring solid material of palpable particulate form from one location to another, the method comprising: passing the solid material downwardly from a first region through a confined passage as a compact gravitating column of particles into a confined zone therebelow, periodically removing the solid material from said confined zone and simultaneously preventing the flow of solid material in said confined passage by increasing the gaseous pressure in said confined zone to a pressure which is above that in said first region by an amount sufficient to force the solid material to move upwardly through and out of the upper end of the passage and preventing disruption of the compactness of the column and upward discharge of the solid material from said passage by maintaining the same divided into laterally separated subdivisions having minimum lateral dimensions of at least eight times the maximum diameter of the particle of the solid material and a hydraulic radius less than four inches and by maintaining on top of said column a compact expanded bed of said material of such horizontal and vertical dimensions as to cause the gas from the non-expanded portion of the bed to decelerate to a velocity slightly below the bed disrupting velocity at a level spaced a substantial distance below the bed surface the length of the bed above that level being sufficient to overcome the upward thrust of the solid particles below said level.

4. A method for supplying solid material of palpable particulate form from a first zone to a second zone of substantially higher pressure located below said first zone to a vertical distance substantially less than that corresponding to a column of said solids of sufficient length to permit the gravity flow of the solids into said lower zone which method comprises: flowing the solid material downwardly from said first zone through a first passage as a confined compact stream and discharging it downwardly into a confined pressuring zone located elevationally between said first and second zones and existing under a pressure substantially below that in said second zone and sufficiently low to permit gravity flow of the solids thereinto from said first zone, partitioning the body of solids in said passage into laterally separated subdivisions having a minimum lateral dimension at least equal to 8 times the maximum particle diameter and a hydraulic radius less than 4 inches, periodically increasing the gaseous pressure in said pressuring zone to a level near that in said second zone and sufficiently high to permit flow of the solids from said pressuring zone downwardly through a second passage as a compact stream of less horizontal cross-section than said pressuring zone into said second zone, while without obstructing said first passage, maintaining the same filled substantially throughout its length with a compact column of said solids and withdrawing gas escaping upwardly from said column through a compact bed of said solids maintained in the first zone on top of said column, said bed being of substantially greater horizontal cross-sectional area than said column, reducing the gaseous pressure in said pressuring zone periodically to prevent said pressuring zone from emptying of solid material and to replenish said solid material supply from said first zone, and while without obstructing said second passage, maintaining the same filled substantially throughout its length with a compact column of said solids and withdrawing gas escaping upwardly from said column through a compact bed of said solids maintained in the pressuring zone on top of said column, said bed being of substantially greater horizontal cross-sectional area than said column.

5. A method for supplying solid material of palpable particulate form from a first zone to a second zone of substantially higher pressure located below said first zone a vertical distance substantially less than that corresponding to a column of said solids of sufficient length to permit the gravity flow of the solids into said lower zone which method comprises: flowing the solid material downwardly from said first zone through a first passage as a confined compact stream and discharging it downwardly into a confined pressuring zone located elevationally between said first and second zones and existing under a pressure substantially below that in said second zone and sufficiently low to permit gravity flow of the solids thereinto from said first zone, partitioning the body of solids in said passage into laterally separated subdivisions having a minimum lateral dimension at least equal to 2 inches and a hydraulic radius less than 2 inches, periodically increasing the gaseous pressure in said pressuring zone to a level near that in said second zone and sufficiently high to permit flow of the solids from said pressuring zone downwardly through a second passage as a compact stream of less horizontal cross-section than said pressuring zone into said second zone, while without obstructing said first passage, maintaining the same filled substantially throughout its length with a compact column of said solids and withdrawing gas escaping upwardly from said column through a compact bed of said solids maintained in the first zone on top of said column, said bed being of substantially greater horizontal cross-sectional area than said column, reducing the gaseous pressure in said pressuring zone periodically to prevent said pressuring zone from emptying of solid material and to replenish said solid material supply from said first zone, and while without obstructing said second passage, maintaining the same filled substantially throughout its length with a compact column of said solids and withdrawing gas escaping upwardly from said column through a compact bed of said solids maintained in the pressuring zone on top of said column, said bed being of substantially greater horizontal cross-sectional area than said column.

6. In a process for transferring solid material of palpable particulate form from one location to another, the method comprising: supplying solid material to first region to maintain a compact bed of solids in the lower portion thereof, splitting the solids at at least one level in said bed into a plurality of vertical laterally-separated subdivisions, said subdivisions having lateral dimensions of at least five times the maximum particle diameter, hydraulic radii less than sixteen inches and a vertical height at least equal to the minimum lateral width of the subdivisions, gravitating the solid material downwardly from the bottom of said region in compact condition through a confined passage into a confined zone therebelow, periodically removing the solid material from said confined zone and simultaneously preventing the flow of solid material in said confined passage by increasing the gaseous pressure in said confined zone to provide a pressure differential across the confined passage in excess of about ½ p. s. i./ft. of vertical column height and preventing disruption of the compactness of the column and upward discharge of the solid material from said passage by maintaining the bed in said first region of such cross-section and vertical depth that gas from the non-expanded portion of the seal column is decelerated to a velocity slightly below the bed disrupting velocity below the surface of the bed, that portion of the bed above said level being of sufficient length to overcome the upward thrust of the solid particles below said level.

7. A method for supplying solid material of palpable particulate form from a first zone to a second zone of substantially higher pressure located below said first zone a vertical distance substantially less than that corresponding to a column of said solids of sufficient length to permit the gravity flow of the solids into said lower zone which method comprises: supplying solid material to said first zone to maintain a compact bed of solids in the lower portion thereof, maintaining the solids at at least one level in said bed subdivided into a plurality of vertical laterally-separated subdivisions, so as to substantially reduce the hydraulic radius of the zone at said level, flowing the solid material downwardly from said first zone through a first passage as a confined compact stream and discharging it downwardly into a confined pressuring zone located elevationally between said first and second zones and existing under a pressure substantially below that in said second zone and sufficiently low to permit gravity flow of the solids thereinto from said first zone, so as to maintain a compact bed of solids in the lower portion of said pressuring zone, maintaining the bed of solids in said pressuring zone at at least one level in said bed subdivided into a plurality of laterally-separated subdivisions, so as to substantially reduce the hydraulic radius of the zone at said level, periodically increasing the gaseous pressure in said pressuring zone to a level near that in said second zone and sufficiently high to permit flow of the solids from said pressuring zone downwardly through a second passage as a compact stream into said second zone, while without obstructing said first passage, maintaining the same filled substantially throughout its length with a compact column of said solids and withdrawing gas escaping upwardly from said column through the compact bed of said solids maintained in the first zone on top of said column, said bed being of substantially greater horizontal cross-sectional area than said column, reducing the gaseous pressure in said pressuring zone periodically to prevent said pressuring zone from emptying of solid material and to replenish said solid material supply from said first zone and, while without obstructing said second passage, maintaining the same filled substantially throughout its length with a compact column of said solids and withdrawing gas escaping upwardly from said column through the compact bed of said solids maintained in the pressuring zone on top of said column, said bed being of substantially greater horizontal cross-sectional area than said column.

8. A method for supplying solid material of palpable particulate form from a first zone to a second zone of substantially higher pressure located below said first zone a vertical distance substantially less than that corresponding to a column of said solids of sufficient length to permit the gravity flow of the solids into said lower zone which method comprises: supplying solid material to said first zone to maintain a compact bed of solids in the lower portion thereof, maintaining the solids at at least one level in said bed subdivided into a plurality of laterally-separated subdivisions, said subdivisions having lateral dimensions of at least two inches, hydraulic radii less than two inches and a vertical height at least equal to the equivalent diameter of the cross-section of the subdivisions, flowing the solid material downwardly from said first zone through a first passage as a confined compact stream and discharging it downwardly into a confined pressuring zone located elevationally between said first and second zones and existing under a pressure substantially below that in said second zone and sufficiently low to permit gravity flow of the solids thereinto from said first zone, so as to maintain a compact bed of solids in the lower portion of said pressuring zone, maintaining the bed of solids in said pressuring zone at at least one level in said bed subdivided into a plurality of laterally-separated subdivisions, said subdivisions having lateral dimensions of at least two inches, hydraulic radii less than two inches and a vertical height at least equal to the equivalent diameter of the cross-section of the subdivision, periodically increasing the gaseous pressure in said pressuring zone to a level near that in said second zone and sufficiently high to permit flow of the solids from said pressuring zone downwardly through a second passage as a compact stream into said second zone, while without obstructing said first passage, maintaining the same filled substantially throughout its length with a compact column of said solids and withdrawing gas escaping upwardly from said column through the compact bed of said solids maintained in the first zone on top of said column, said bed being of sufficient horizontal cross-section and vertical depth to prevent disruption of the bed, reducing the gaseous pressure in said pressuring zone periodically to prevent said pressuring zone from emptying of solid material and to replenish said solid material supply from said first zone and, while without obstructing said second passage, maintaining the same filled substantially throughout its length with a compact column of said solids and withdrawing gas escaping upwardly from said column through the compact bed of said solids maintained in the pressuring zone on top of said column, said bed being of sufficient horizontal cross-section and vertical depth to prevent disruption of the bed.

9. In a process for transferring solid material of palpable particulate form from one location to another, the method comprising: supplying solid material to a first zone to maintain a compact bed of solids in the lower portion thereof, maintaining the solids at at least one level in said bed subdivided into a plurality of laterally-separated subdivisions, said subdivisions having lateral dimensions of at least five tmes the maximum particle diameter, hydraulic radii less than sixteen inches, and a vertical height at least equal to the minimum lateral width of the subdivisions, transferring the solids downwardly from the bottom of said first zone through a confined passage as a compact gravitating column of particles into confined zone therebelow, maintaining partitioned solid material in the passage downwardly from the top of said passage a distance equal to about 1¼–3 times the diameter of the of the passage, so as to provide separated subdivisions of at least 8 times the largest particle diameter in minimum lateral dimension, and a hydraulic radius not larger than 4 inches, periodically increasing the pressure in said pressuring zone to a pressure which is above that in said first zone and sufficient to effect a pressure differential across the confined passage in excess of about ½ p. s. i. per ft. of passage length, so as to stop the flow of solids through said passage and effect removal of the pressuring zone to a receiving zone, and preventing disruption of the compactness of the column and upward discharge of the solid material from said passage by maintaining the bed on top of said column of sufficient cross-sectional area and vertical depth, so that the gas passing upwardly through the bed is decelerated to the bed disrupting velocity at a level at least far enough below the surface of the bed to provide downward forces at that level at least equal to the upward push of the solid material therebelow.

No references cited.